(12) United States Patent
Waldspurger et al.

(10) Patent No.: US 12,147,844 B2
(45) Date of Patent: Nov. 19, 2024

(54) VM MEMORY RECLAMATION BY BUFFERING HYPERVISOR-SWAPPED PAGES

(71) Applicant: Nutanix, Inc., San Jose, CA (US)

(72) Inventors: Carl Alan Waldspurger, Palo Alto, CA (US); Florian Anselm Johannes Schmidt, Cambridge (GB); Jonathan James Davies, Cambridge (GB)

(73) Assignee: Nutanix, Inc., San Jose, CA (US)

( * ) Notice: Subject to any disclaimer, the term of this patent is extended or adjusted under 35 U.S.C. 154(b) by 394 days.

(21) Appl. No.: 17/191,980

(22) Filed: Mar. 4, 2021

(65) Prior Publication Data

US 2022/0283873 A1 Sep. 8, 2022

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5016* (2013.01); *G06F 9/5022* (2013.01); *G06F 2009/45583* (2013.01)

(58) Field of Classification Search
CPC .. G06F 9/5077; G06F 9/45558; G06F 9/5016; G06F 9/5022; G06F 2009/45583
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 2007/0156981 | A1* | 7/2007 | Bitner ................. G06F 12/121 711/E12.07 |
| 2012/0036325 | A1* | 2/2012 | Mashtizadeh ....... G06F 12/0802 711/E12.016 |

(Continued)

FOREIGN PATENT DOCUMENTS

| CN | 101131673 A | * | 2/2008 |
| KR | 100836162 B1 | * | 6/2008 |

OTHER PUBLICATIONS

Kim, KR100836162B1 Description Translation, Jun. 9, 2008, [database online], [retrieved on May 22, 2023] Retrieved from Espacenet using Internet <URL:https://worldwide.espacenet.com/publicationDetails/description?CC=KR&NR=100836162B1&KC=B1&FT=D&ND=3&date=20080609&DB=&locale=en_EP>, pp. 1-9 (Year: 2008).*

(Continued)

*Primary Examiner* — Meng Ai T An
*Assistant Examiner* — Hsing Chun Lin
(74) *Attorney, Agent, or Firm* — Foley & Lardner LLP (57) ABSTRACT

In some aspects, a non-transitory computer readable storage medium includes instructions stored thereon that, when executed by a processor, cause the processor to detect that system software is proceeding to swap memory content of a virtual machine (VM) from memory to storage, wherein the memory is allocated to the VM; buffer the memory content; and perform alternative memory reclamation of the memory.

13 Claims, 4 Drawing Sheets

(56) References Cited

U.S. PATENT DOCUMENTS

| | | | | |
|---|---|---|---|---|
| 2013/0290641 A1* | 10/2013 | Corrie | ............... | G06F 12/023 |
| | | | | 711/E12.07 |
| 2013/0339568 A1* | 12/2013 | Corrie | ............... | G06F 9/45558 |
| | | | | 711/6 |
| 2015/0039838 A1* | 2/2015 | Tarasuk-Levin | ...... | G06F 9/5016 |
| | | | | 711/137 |
| 2018/0032430 A1* | 2/2018 | Malladi | ............... | G06F 13/1668 |
| 2019/0370043 A1* | 12/2019 | Olderdissen | .......... | G06F 3/0604 |
| 2020/0241794 A1* | 7/2020 | Yeo | ............... | G06F 12/1408 |

OTHER PUBLICATIONS

Tang et al. CN101131673A Description Translation, Feb. 27, 2008, [database online], [retrieved on May 22, 2023] Retrieved from Espacenet using Internet <URL:https://worldwide.espacenet.com/publicationDetails/description?CC=CN&NR=101131673A&KC=A&FT=D&ND=3&date=20080227&DB=&locale=en_EP>, pp. 1-18 (Year: 2008).*

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

* cited by examiner

VM MEMORY RECLAMATION BY BUFFERING HYPERVISOR-SWAPPED PAGES

BACKGROUND

Hypervisors and operating systems may implement demand paging to support virtual memory. In some embodiments, virtual memory provides an illusion of more random-access memory (RAM) than is physically available.

SUMMARY

In some aspects, a non-transitory computer readable storage medium includes instructions stored thereon that, when executed by a processor, cause the processor to detect that system software is proceeding to swap memory content of a virtual machine (VM) from memory to storage, wherein the memory is allocated to the VM; buffer the memory content; and perform alternative memory reclamation of the memory.

In some aspects, the medium further includes instructions stored thereon that, when executed by a processor, cause the processor to request, to the VM, to reclaim a predetermined amount of the memory. In some aspects, the memory content is buffered by a hypervisor. In some aspects, the memory content is buffered by a component in a swap-out path. In some aspects, the medium further includes instructions stored thereon that, when executed by a processor, cause the processor to buffer the memory content for no greater than a predetermined time interval for performing the alternative memory reclamation; and within the predetermined time interval, perform the alternative memory reclamation.

In some aspects, the medium further includes instructions stored thereon that, when executed by a processor, cause the processor to determine an upper-threshold on an amount of buffer memory that can be used for buffering the memory content. In some aspects, buffering the memory content is performed by a first service and performing the alternative memory reclamation is performed by a second service. In some aspects, the medium further includes instructions stored thereon that, when executed by a processor, cause the processor to use a Linux frontswap interface to detect that the system software is proceeding to swap the memory content.

In some aspects, an apparatus includes a processor and a memory, wherein the memory includes programmed instructions that, when executed by the processor, cause the apparatus to detect that system software is proceeding to swap memory content of a virtual machine (VM) from memory to storage, wherein the memory is allocated to the VM; buffer the memory content; and perform alternative memory reclamation of the memory.

In some aspects, a computer-implemented method includes detecting that system software is proceeding to swap memory content of a virtual machine (VM) from memory to storage, wherein the memory is allocated to the VM; buffering the memory content; and performing alternative memory reclamation of the memory.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Hypervisors and operating systems may implement demand paging to support virtual memory. In some embodiments, virtual memory provides an illusion of more random-access memory (RAM) than is physically available. When memory is overcommitted, the operating system may reclaim pages resident in RAM, swapping out the contents of the RAM to a slower backing store (e.g., disk storage, local non-volatile memory (NVM), NVM accessed across a network, or remote RAM accessed across a network), from which the contents can later be read on demand if needed. In some embodiments, the hypervisor may perform memory reclamation. In some embodiments, such as in the Linux/KVM, the host operating system also functions as the hypervisor. Such swapping can often cause drastic performance degradation, since accessing a swapped-out page is several orders of magnitude slower than accessing a memory-resident page.

Alternative techniques for reclaiming virtual machine (VM) memory, such as ballooning, memory compression, and memory deduplication, can result in significantly better performance. For example, a hypervisor may use ballooning to reclaim VM memory by directing a cooperating "balloon driver" running within the VM to "inflate". The balloon driver inflates by allocating guest-physical pages that the guest operating system considers the least valuable to its performance, allowing them to be reclaimed by the hypervisor.

In some embodiments lacking the improvements disclosed herein, virtualization systems automatically (e.g., by default) use alternative techniques (e.g., automatic dynamic ballooning, per-VM balloon targets) for reclaiming VM memory by default, falling back to less-performant hypervisor-level swapping only when necessary (e.g. if the VM balloon drivers are uncooperative, or unable to quickly reclaim sufficient memory). In contrast, some virtualization systems (e.g., Linux/KVM) may not support alternative techniques for reclaiming VM memory. Such systems may instead require alternative techniques to be configured manually. As a result, such virtualization systems can suffer from extremely poor performance when VM memory is overcommitted.

Disclosed herein are embodiments of a system and method for automatically converting hypervisor-level swapping operations into more performant memory reclamation techniques. Some embodiments interpose on swapping activity in order to buffer a limited number of swapped pages in memory. In some embodiments, the buffering provides enough time to react to the onset of swapping by reclaiming memory from VMs using ballooning or other alternative reclamation techniques.

Advantageously, by efficiently reclaiming memory, overall memory pressure can be reduced, which will prevent further hypervisor-level swapping. In some embodiments, by allowing the VM to determine which memory is most suitable for reclaiming (e.g., currently-unused "free" memory, memory caching disk blocks, or least recently/frequently used memory), the likelihood of future swapping is reduced. In short, interposing on hypervisor-level swapping may enable prompt notification that memory is to be reclaimed using an alternative memory reclamation technique, and buffering swapped pages in memory can ensure that a limited amount of already-swapped memory does not cause significant performance degradation while the alternative memory reclamation technique catches up and reclaims enough memory to prevent further swapping.

Figure 1A:
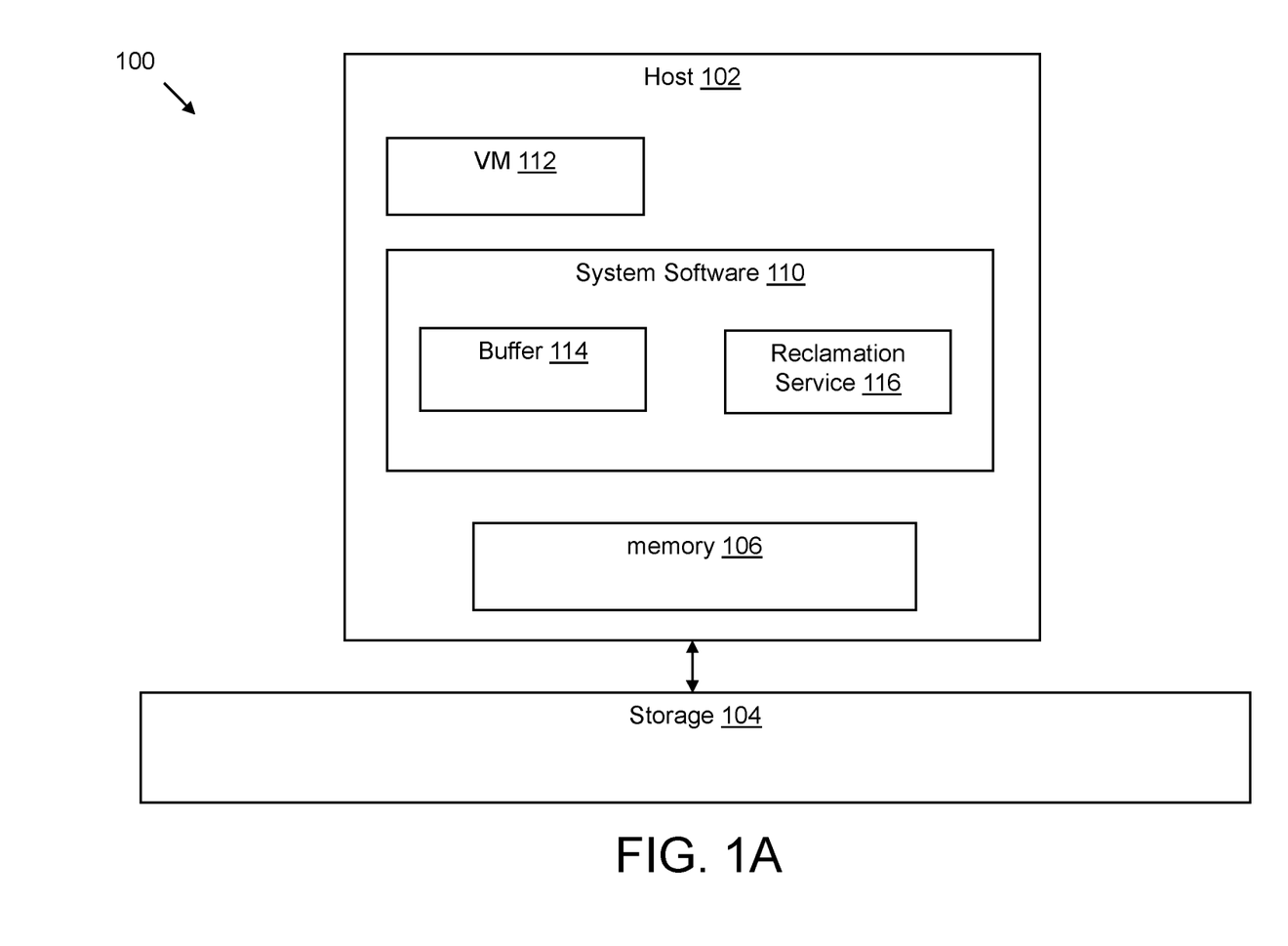
FIG. 1A is an example block diagram of a virtual environment for enabling alternative memory reclamation, in accordance with some embodiments of the present disclosure.

FIG. 1A illustrates a block diagram of a virtual environment 100 environment for enabling alternative memory reclamation, in accordance with some embodiments. The virtual environment 100 includes a host (e.g., node, machine, computer) 102 and a storage (e.g., swap space) 104 coupled to the host 102. In some embodiments, the host 102 includes underlying hardware such as memory 106, one or more physical disks, one or more input/output (I/O) devices, and one or more central processing units (CPUs). In some embodiments, the host 102 includes system software (a bare-metal hypervisor, a hosted/kernel-based hypervisor, a host operating system such as Linux, a kernel, or a combination thereof) 110, and a virtual machine (e.g., a guest VM) 112. In some embodiments, the host 102 includes a host operating system separate from the system software 110. In some embodiments, the memory 106 includes metadata such as one or more of a page table or a logical block address (LBA)-to-physical block address (PBA) mapping table.

The memory 106 may store content (e.g., memory content, data) of non-swapped pages. The storage 104 may store content of swapped pages. In some embodiments, each page table entry (PTE) of the page table that corresponds to a guest physical page in the memory 106 (e.g., non-swapped guest physical page) specifies a physical address (e.g., in the memory 106) for the non-swapped guest physical page. In some embodiments, each entry of the page table that corresponds to a guest physical page in the storage 104 (e.g., a swapped guest physical page) specifies a swap location (e.g., in the storage 104).

The system software 110 may enable use of a kernel-based hypervisor and/or other loadable kernels. The system software 110 may virtualize the underlying resources (e.g., one or more of compute, storage, or network resources, resources of the host 102, resources of the storage 104) for virtual machines such as the VM 112. The system software 110 may offer a hyperconverged solution.

In some embodiments, the system software 110 includes a buffer 114. The buffer 114 may interpose on swapping activity. The buffer 114 may receive swapped pages (e.g., pages to be swapped) from the memory 106. In some embodiments, a limited amount of host-physical memory (e.g., the memory 106, or a portion thereof) is dedicated as an in-memory buffer for absorbing swapped pages (e.g., the buffer 114 buffers the swapped pages in the memory 106). A Linux frontswap interface may be inserted into the swap path to interpose on swapping activity. In some embodiments, the buffer 114 is a loadable kernel implementation of a frontswap backend for the frontswap interface.

In some embodiments, the buffer 114 buffers the swapped pages for a predetermined time interval that is sufficient for the virtualization environment 100 to perform alternative memory reclamation techniques. In some embodiments, the buffer 114 buffers a predetermined number of pages, e.g. swapping out the oldest pages from the buffer 114 to accommodate new pages entering the buffer 114. For example, some pages from the buffer 114 (e.g., least recently used or random selection) may be evicted and swapped out to storage 104 to make room for new incoming pages. Some embodiments may place constraints on both the size of the buffer 114 and the amount of time pages are buffered. In some embodiments, buffered pages can then be swapped-in to the VM 112, from the in-memory buffer 114. Advantageously, swapping-in from the in-memory buffer 114 may be faster than swapping-in from the storage 104.

In some embodiments, the system software 110 includes a reclamation service 116 in communication with the buffer 114. In some embodiments, the buffer 114 or the frontswap interface notifies the reclamation service 116 of the swapping activity (e.g., that the swapping activity is underway). In some embodiments, the reclamation service 116 reclaims, or enables reclaiming, memory using alternative techniques such as ballooning, memory compression, or memory deduplication. In some embodiments, the reclamation service 116 requests that the VM 112 reclaims a predetermined amount of the memory.

In some embodiments, request for the predetermined amount of the memory induces the VM 112 to reclaim the predetermined amount of memory (e.g., to inflate its balloon). In some embodiments, the VM 112 reclaims the predetermined amount of memory. For example, the VM 112 allocates pinned guest-physical memory (e.g., from a portion of the memory 106 that is allocated to the VM 112) inside the VM 112. In some cases, the VM 112 has unused free memory that it uses to satisfy the allocation (without inducing any guest-level swapping). In some cases, the VM 112 frees up memory by evicting data from a buffer cache or employing memory compression. In some cases, the VM 112 swaps-out some memory content from the memory 106 to the storage 104. In some embodiments, the reclamation service 116 instructs the buffer 114 or the frontswap interface that the alternative memory reclamation technique is completed. In some embodiments, the buffer 114 and the reclamation service 116 are a same component or service or are instructions executed by a same processor.

The memory 106 may include, but is not limited to (a) temporary memory device such as RAM or (b) NVM (e.g., persistent memory) such as non-volatile dual in-line memory modules (NVDIMM), read only memory (ROM) device, any type of magnetic storage devices (e.g., hard disk, floppy disk, magnetic strips, etc.), optical disks (e.g., compact disk (CD), digital versatile disk (DVD), etc.), smart cards, solid state devices, etc.

The storage 104 may include, but is not limited to, NVM such as NVDIMM, storage devices, optical disks, smart cards, solid state devices, etc. The storage 104 can be shared with one or more host machines such as the host 102. The storage 104 can store data associated with the host 102. The data can include file systems, databases, computer programs, applications, etc. The storage 104 can also include the swapped out data from the memory 106 of the host 102. In some embodiments, the storage 104 may include swapped out memory data from the host 102 and metadata that includes information regarding the locations of the swapped-out memory data on the storage 104. In some such embodiments, the storage 104 can be partition of a larger storage device or pool. In some embodiments, the storage 104 is a network-attached-storage such as a storage array network (SAN).

Figure 1B:
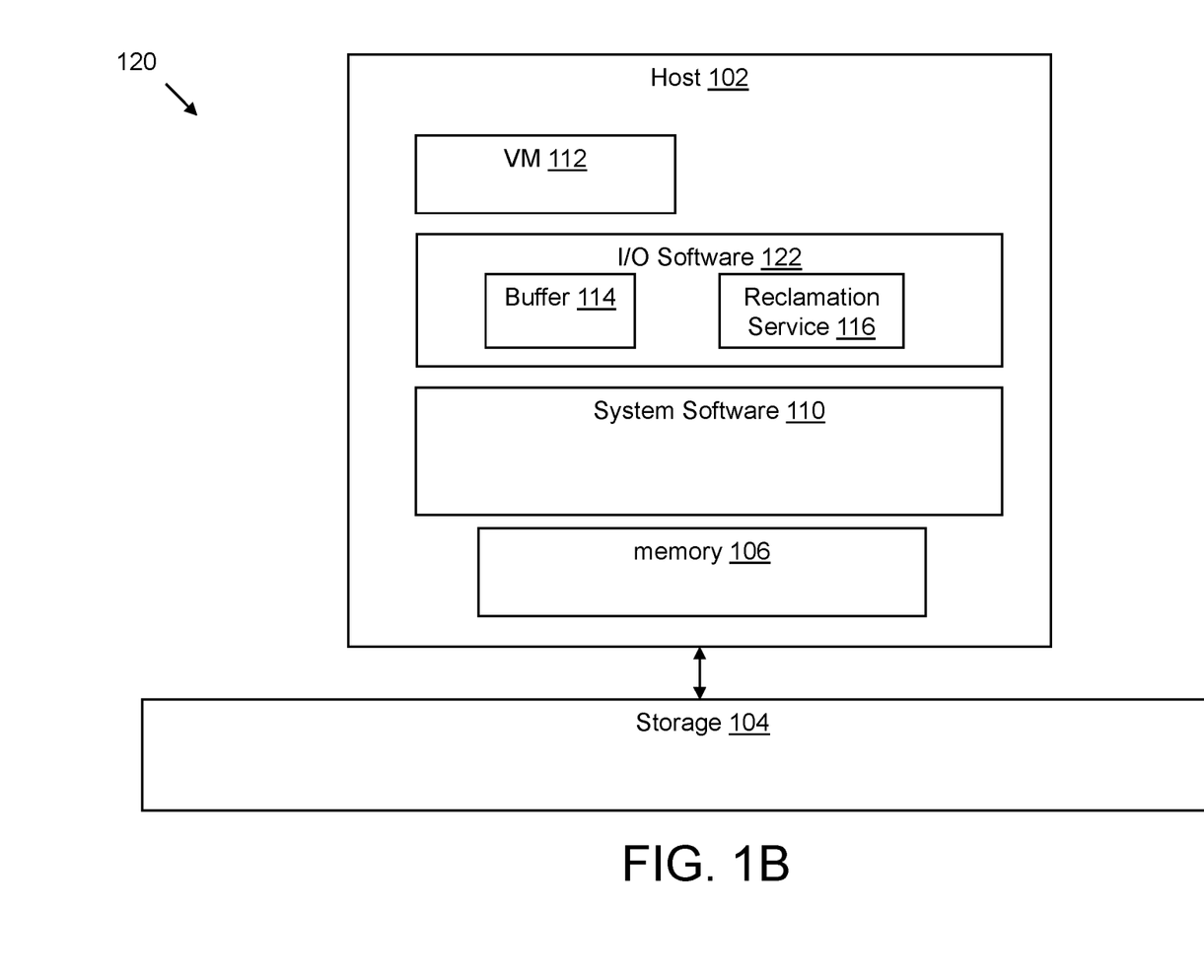
FIG. 1B is an example block diagram of another virtual environment for enabling alternative memory reclamation, in accordance with some embodiments of the present disclosure.

FIG. 1B illustrates a block diagram of another virtual environment 120 environment for enabling alternative memory reclamation, in accordance with some embodiments. In some embodiments, the virtual environment 120 is similar to the virtual environment 100 except for the following differences. In some embodiments, the host 102 includes an I/O controller (e.g., an I/O control service) 122. The I/O controller 122 may manage/control/direct I/O communication (e.g., calls, requests, instructions, disk reads, disk writes) between the host 102 and the storage 104. In some embodiments, the I/O controller 122 runs on a VM (e.g., a controller VM). The I/O controller 122 may interpose on swap-in and swap-out paths in between the system software 110 and the storage 104. In some embodiments, the I/O controller 122, rather than the system software 110, includes the buffer 114 and the reclamation service 116 to interpose on swapping activity. In some embodiments, the I/O controller 122 is a part of the system software 110.

Each of the components/elements/entities (e.g., the host 102, the system software 110, the I/O controller 122, the VM 112, the buffer 114, the reclamation service 116, the memory 106, and the storage 104) of the virtual environments (e.g., the virtual environment 100 and the virtual environment 120), is implemented using hardware, software, or a combination of hardware or software, in one or more embodiments. One or more of the components of the virtual environments may include a processor with instructions or may be an apparatus/device (e.g., server) including a processor with instructions, in some embodiments. In some embodiments, multiple components may be part of a same apparatus and/or share a same processor. Each of the components of the virtual environments can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

Figure 2:
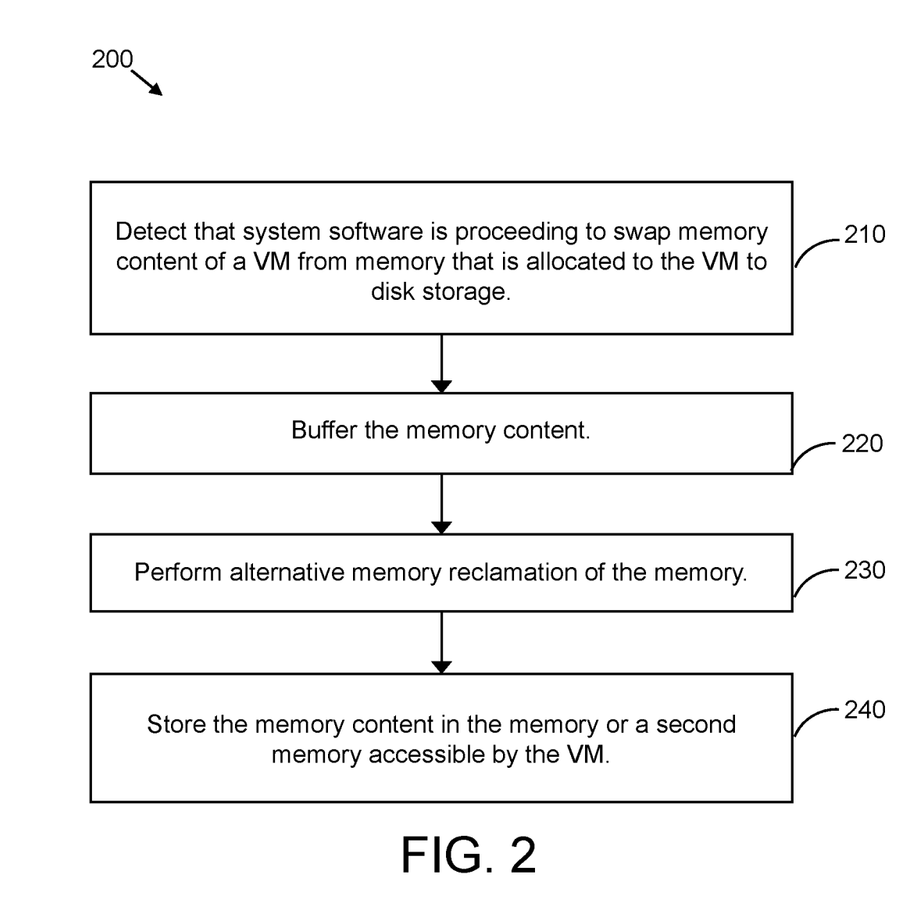
FIG. 2 is an example flowchart of a method, in accordance with some embodiments of the present disclosure.

Referring now to FIG. 2, a flowchart of an example method 200 is illustrated, in accordance with some embodiments of the present disclosure. The method 200 may be implemented using, or performed by, one or more of the virtual environments (e.g., the virtual environment 100 or the virtual environment 120), one or more components (e.g., the host 102, the system software 110, the I/O controller 122, the buffer 114, or the reclamation service 116) of one or more of the virtual environments, a processor associated with one or more of the virtual environments, or a processor of the one or more components of the one or more of the virtual environments. Additional, fewer, or different operations may be performed in the method 200 depending on the embodiment. Additionally, or alternatively, two or more of the blocks of the method 200 may be performed in parallel.

As shown in FIG. 2, in some embodiments, the processor detects that system software is proceeding to swap memory content of a VM, such as the VM 112, from memory, such as the memory 106, to disk storage, such as the storage 104 (block 210). The memory, or a portion thereof, may be allocated to the VM. In some embodiments, the processor buffers the memory content (block 220). In some embodiments, the memory content is buffered at one or more of a hypervisor (e.g., the system software 110) or at a component/location/point of a swap-out path (e.g., the I/O Controller 122). In some embodiments, the processor buffers the memory content for no greater than a predetermined time interval for performing the alternative memory reclamation, and within the predetermined time interval, performing the alternative memory reclamation. In some embodiments, the processor buffers up to a fixed amount of memory. In some embodiments, the processor uses some combination of space-based and time-based thresholds.

As further shown in FIG. 2, in some embodiments, the processor performs alternative memory reclamation of the memory (block 230). In some embodiments, buffering the memory content is performed by a first service and performing the alternative memory reclamation is performed by a second service. In some embodiments, the processor requests (e.g., specifies, instructs), to the VM, the aggregate amount of memory to be reclaimed. For example, the VM may have unused pages on its free list, or may be able to shrink various caches to reclaim memory, without resorting to swapping.

Figure 3:
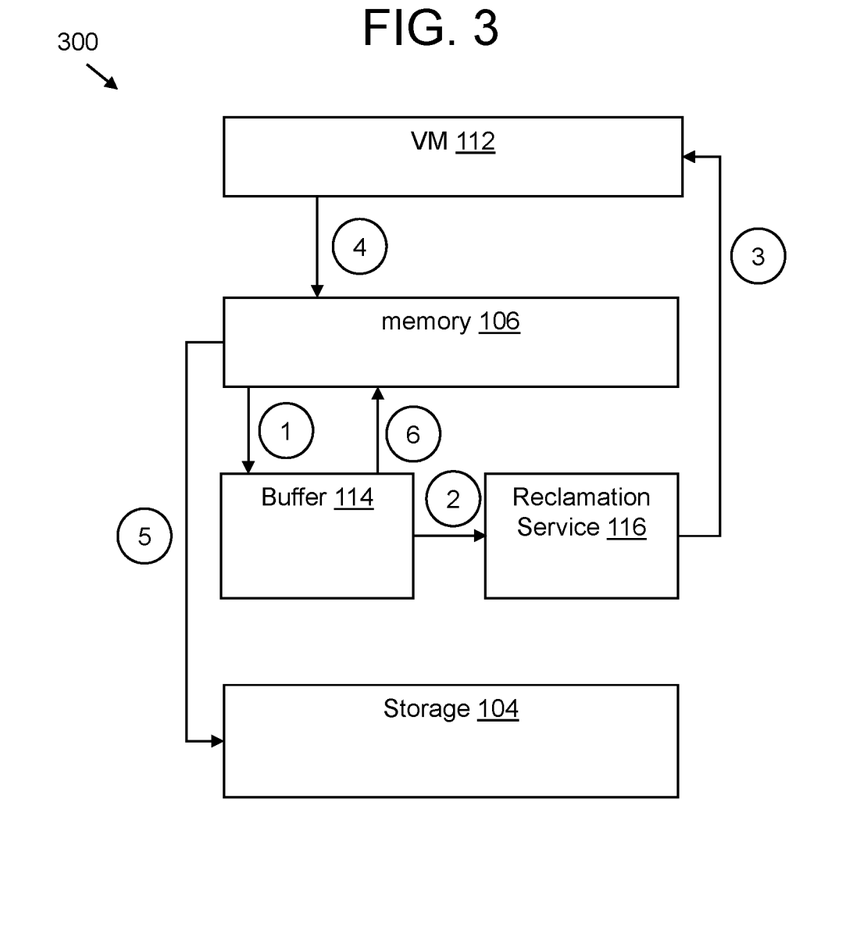
FIG. 3 is a diagram illustrating alternative memory reclamation, in accordance with some embodiments of the present disclosure.

FIG. 3 is a diagram illustrating alternative memory reclamation, in accordance with some embodiments of the present disclosure. At step 1, the pages to be swapped may be sent to the buffer 114. At step 2, the buffer 114 may indicate to the reclamation service 116 that the pages are to be swapped to the storage 104. At step 3, the reclamation service 116 specifies, to the VM 112 an amount of memory to be reclaimed (e.g., via a balloon driver on VM 112). At step 4, the VM 112 reclaims the memory of the specified amount. In some embodiments, the VM 112 reclaims the specified amount of memory by swapping out pages.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A non-transitory computer readable storage medium comprising instructions stored thereon that, when executed by a processor, cause the processor to:
   identify memory pages to be swapped from a memory associated with a virtual machine (VM) to a storage via hypervisor-level swapping;
   interpose on the hypervisor-level swapping of the identified memory pages to the storage by sending the identified memory pages to a memory buffer configured to buffer a predetermined number of memory pages, wherein some memory pages in the memory buffer prior to receipt of the identified memory pages are swapped from the memory buffer to the storage to accommodate the identified memory pages;
   notify a reclamation service that the identified memory pages sent to the memory buffer are about to be swapped to the storage via the hypervisor-level swapping, wherein the reclamation service sends to the VM an indication of a memory amount to be reclaimed by the VM;
   retain the identified memory pages in the memory buffer for a predetermined time interval for performing memory reclamation via ballooning, wherein a number of the identified memory pages is less than the predetermined number of memory pages; and
   while the identified memory pages are in the memory buffer, reclaim, via ballooning, within the predetermined time interval, the memory amount;
   allow the identified memory pages to be sent from the memory buffer to the memory associated with the VM.

2. The non-transitory computer readable storage medium of claim 1, wherein the memory buffer is within a hypervisor.

3. The non-transitory computer readable storage medium of claim 1, wherein the identified memory pages are sent to the memory buffer in a swap-out path.

4. The non-transitory computer readable storage medium of claim 1, further comprising instructions stored thereon that, when executed by the processor, cause the processor to determine an upper threshold on an amount of the memory buffer that can be used for buffering the identified memory pages.

5. The non-transitory computer readable storage medium of claim 1, further comprising instructions stored thereon that, when executed by the processor, cause the processor to use a Linux frontswap interface to detect that the identified memory pages are about to be swapped to the storage.

6. An apparatus comprising a processor and a memory, wherein the memory includes programmed instructions that, when executed by the processor, cause the apparatus to:
- identify memory pages to be swapped from a memory associated with a virtual machine (VM) to a storage via hypervisor-level swapping;
- interpose on the hypervisor-level swapping of the identified memory pages to the storage by sending the identified memory pages to a memory buffer configured to buffer a predetermined number of memory pages, wherein some memory pages in the memory buffer prior to receipt of the identified memory pages are swapped from the memory buffer to the storage to accommodate the identified memory pages;
- notify a reclamation service that the identified memory pages sent to the memory buffer are about to be swapped to the storage via the hypervisor-level swapping, wherein the reclamation service sends to the VM an indication of a memory amount to be reclaimed by the VM;
- retain the identified memory pages in the memory buffer for a predetermined time interval for performing memory reclamation via ballooning, wherein a number of the identified memory pages is less than the predetermined number of memory pages;
- while the identified memory pages are in the memory buffer, reclaim, via ballooning, within the predetermined time interval, the memory amount; and
- allow the identified memory pages to be sent from the memory buffer to the memory associated with the VM.

7. The apparatus of claim 6, wherein the memory buffer is within a hypervisor.

8. The apparatus of claim 6, wherein the identified memory pages are sent to the memory buffer in a swap-out path.

9. The apparatus of claim 6, wherein the memory further includes programmed instructions that, when executed by the processor, cause the apparatus to determine an upper threshold on an amount of the memory buffer that can be used for buffering the identified memory pages.

10. A computer-implemented method comprising:
- identifying memory pages to be swapped from a memory associated with a virtual machine (VM) to a storage via hypervisor-level swapping;
- interposing on the hypervisor-level swapping of the identified memory pages to the storage by sending the identified memory pages to a memory buffer configured to buffer a predetermined number of memory pages, wherein some memory pages in the memory buffer prior to receipt of the identified memory pages are swapped from the memory buffer to the storage to accommodate the identified memory pages;
- notify a reclamation service that the identified memory pages sent to the memory buffer are about to be swapped to the storage via the hypervisor-level swapping, wherein the reclamation service sends to the VM an indication of a memory amount to be reclaimed by the VM;
- retaining the identified memory pages in the memory buffer for a predetermined time interval for performing memory reclamation via ballooning, wherein a number of the identified memory pages is less than the predetermined number of memory pages;
- while the identified memory pages are in the memory buffer, reclaiming, via ballooning, within the predetermined time interval, the memory amount; and
- allowing the identified memory pages to be sent from the memory buffer to the memory associated with the VM.

11. The method of claim 10, wherein the memory buffer is within a hypervisor.

12. The method of claim 10, wherein the identified memory pages are sent to the memory buffer in a swap-out path.

13. The method of claim 10, further comprising determining an upper threshold on an amount of the memory buffer that can be used for buffering the identified memory pages.

* * * * *